(12) United States Patent
Uchida

(10) Patent No.: US 12,027,180 B1
(45) Date of Patent: Jul. 2, 2024

(54) MAGNETIC DISK DEVICE AND CONTROL METHOD

(71) Applicants: Kabushiki Kaisha Toshiba, Tokyo (JP); Toshiba Electronic Devices & Storage Corporation, Tokyo (JP)

(72) Inventor: Takato Uchida, Hiratsuka Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/236,910

(22) Filed: Aug. 22, 2023

(30) Foreign Application Priority Data

Mar. 23, 2023 (JP) .................. 2023-046719

(51) Int. Cl.
*G11B 27/36* (2006.01)
*G11B 5/09* (2006.01)
*G11B 5/596* (2006.01)
*G11B 19/04* (2006.01)
*G11B 20/18* (2006.01)

(52) U.S. Cl.
CPC .............. *G11B 19/045* (2013.01); *G11B 5/09* (2013.01); *G11B 5/59655* (2013.01)

(58) Field of Classification Search
CPC .......... G11B 5/09; G11B 27/36; G11B 20/12; G11B 20/1205; G11B 20/1209; G11B 20/18
USPC .......................................... 360/52
See application file for complete search history.

(56) References Cited

U.S. PATENT DOCUMENTS

| 5,105,427 A * | 4/1992 | Ando ................. G11B 20/18 |
| 11,360,671 B2 | 6/2022 | Qiang et al. |
| 2010/0188767 A1 | 7/2010 | Hirose et al. |

FOREIGN PATENT DOCUMENTS

JP 2010-152988 A 7/2010

* cited by examiner

*Primary Examiner* — Nabil Z Hindi
(74) *Attorney, Agent, or Firm* — Maier & Maier, PLLC

(57) ABSTRACT

A magnetic disk device according to one embodiment includes a magnetic disk on which multiple tracks are provided, a magnetic head, and a controller. At least one of the multiple tracks includes first sectors and a second sector. Each of the first sectors stores data segments. The second sector stores a parity for error correction. The magnetic head executes writing/reading to/from the magnetic disk. The controller executes processing of adjusting a guaranteed number of times by using a second sector being invalid. The guaranteed number of times indicates a number of times of writing for guaranteeing reading from an adjacent track.

12 Claims, 13 Drawing Sheets

| | ZONE | GUARANTEED NUMBER OF TIMES OF WRITE | ADJUSTED FLAG |
|---|---|---|---|
| OUTER CIRCUM-FERENCE | 0 | m | 1 |
| | 1 | m | 1 |
| | 2 | m | 1 |
| | 3 | m | 0 |
| | 4 | m | 0 |
| | 5 | m | 0 |
| | ⋮ | ⋮ | ⋮ |
| MIDDLE CIRCUM-FERENCE | O | n | 1 |
| | O+1 | n | 1 |
| | O+2 | n | 1 |
| | O+3 | n | 0 |
| | ⋮ | ⋮ | ⋮ |
| | P | n | 0 |
| INNER CIRCUM-FERENCE | P+1 | l | 1 |
| | P+2 | l | 1 |
| | Max | l | 1 |

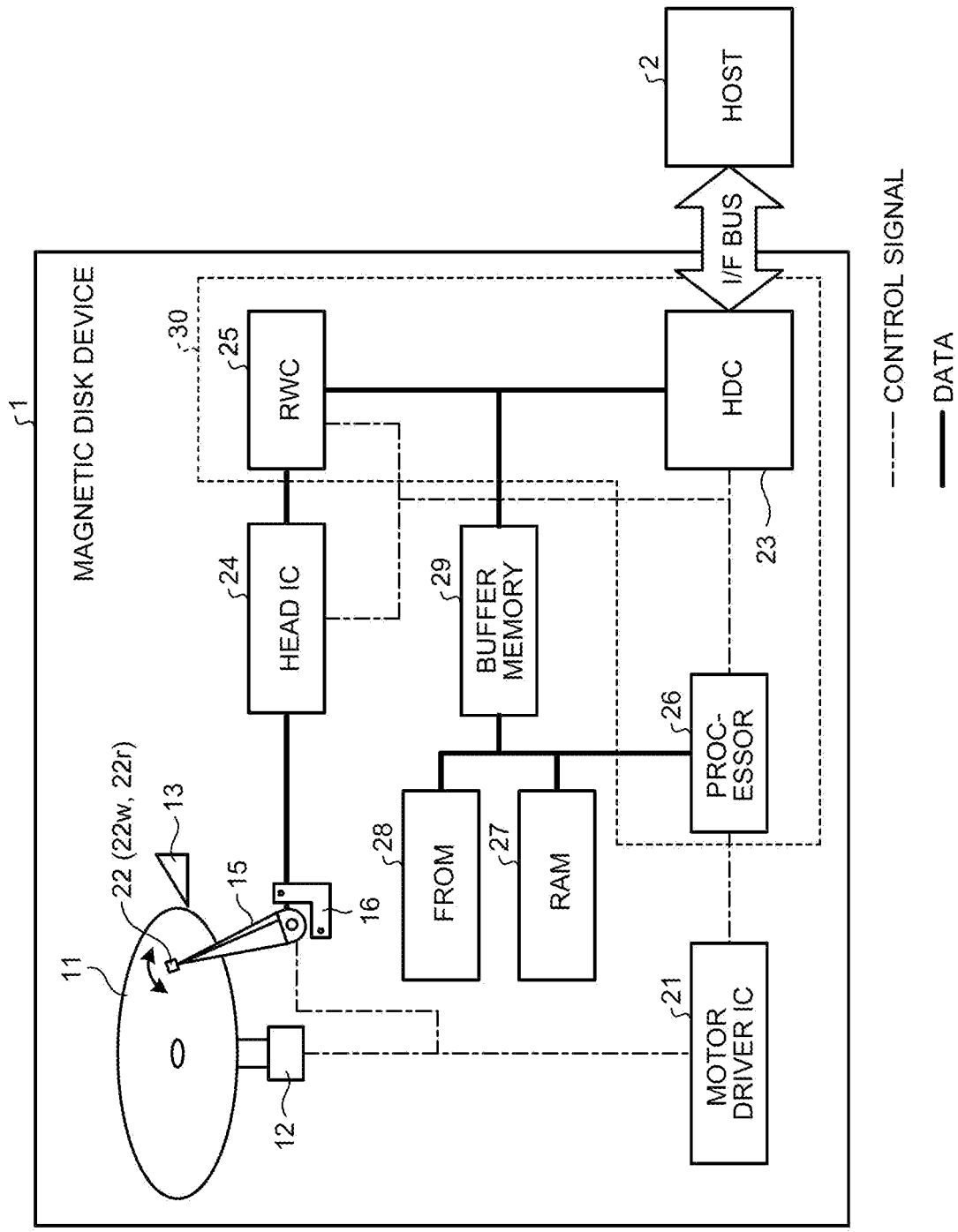

| TRACK NUMBER | ATI COUNTER |
|---|---|
| 0 | 4 |
| 1 | 3 |
| ⋮ | ⋮ |
| N | 6 |

| TRACK NUMBER | WHETHER PARITY SECTOR IS VALID OR INVALID |
|---|---|
| 0 | 0 |
| 1 | 1 |
| 2 | 0 |
| 3 | 0 |
| ⋮ | ⋮ |
| M | 1 |
| M+1 | 1 |
| M+2 | 1 |
| M+3 | 1 |
| ⋮ | ⋮ |
| N | 0 |

FIG.6

| ZONE | GUARANTEED NUMBER OF TIMES OF WRITE | ADJUSTED FLAG |
|---|---|---|
| 0 | m | 1 |
| 1 | m | 1 |
| 2 | m | 1 |
| 3 | m | 0 |
| 4 | m | 0 |
| 5 | m | 0 |
| ⋮ | ⋮ | ⋮ |
| O | n | 1 |
| O+1 | n | 1 |
| O+2 | n | 1 |
| O+3 | n | 0 |
| ⋮ | ⋮ | ⋮ |
| P | n | 0 |
| P+1 | l | 1 |
| P+2 | l | 1 |
| Max | l | 1 |

Zones 0–2: OUTER CIRCUMFERENCE
Zones O–P: MIDDLE CIRCUMFERENCE
Zones P+1–Max: INNER CIRCUMFERENCE

275

MAGNETIC DISK DEVICE AND CONTROL METHOD

CROSS-REFERENCE TO RELATED APPLICATIONS

This application is based upon and claims the benefit of priority from Japanese Patent Application No. 2023-046719, filed on Mar. 23, 2023, the entire contents of which are incorporated herein by reference.

FIELD

Embodiments described herein relate generally to a magnetic disk device and a control method.

BACKGROUND

Adjacent track interference (ATI) has been known as influence on an adjacent track when writing to a magnetic disk is performed. The influence of the ATI on the adjacent track accumulates in accordance with the number of times of writing to one track, and it is eventually difficult to read data from the adjacent track. Therefore, in a case where writing is performed exceeding a given guaranteed number of times of writing before it becomes difficult to read data from the adjacent track, rewriting processing is executed on all the data in the adjacent track. The guaranteed number of times of writing is adjusted in advance before shipment of the magnetic disk device.

BRIEF DESCRIPTION OF THE DRAWINGS

FIG. 1 is a schematic diagram illustrating an example of a configuration of a magnetic disk device according to an embodiment;

FIG. 4 is a schematic diagram illustrating an example of a data structure of ATI management information according to the embodiment;

FIG. 5 is a diagram illustrating an example of a data structure of a parity sector table according to the embodiment;

FIG. 6 is a diagram illustrating an example of a guaranteed-number-of-times-of-writing table according to the embodiment;

DETAILED DESCRIPTION

Figure 2A:
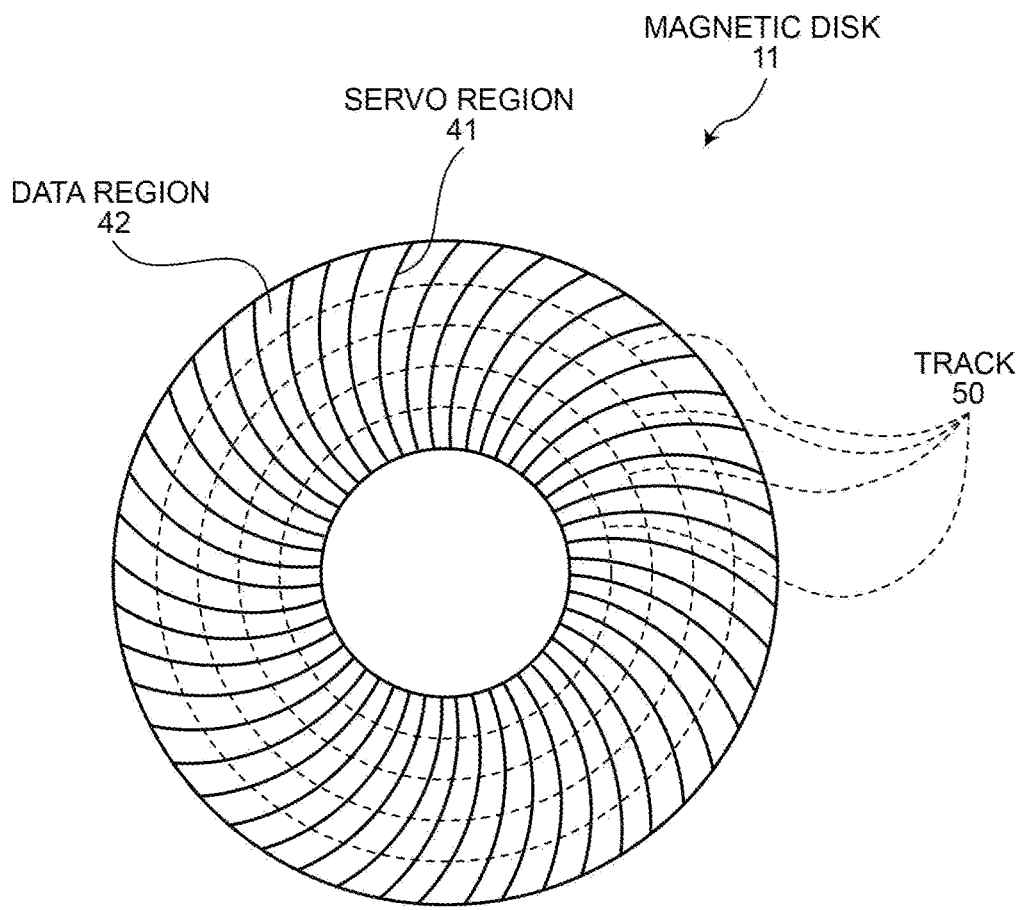
FIG. 2A is a diagram illustrating an example of a configuration of a magnetic disk according to the embodiment.

In general, according to one embodiment, a magnetic disk device includes a magnetic disk on which multiple tracks are provided, a magnetic head, and a controller. At least one of the multiple tracks includes first sectors and a second sector. Each of the first sectors stores data segments. The second sector stores a parity for error correction. The magnetic head executes writing/reading to/from the magnetic disk. The controller executes processing of adjusting a guaranteed number of times by using a second sector being invalid. The guaranteed number of times indicates a number of times of writing for guaranteeing reading from an adjacent track.

Exemplary embodiments of magnetic disk devices will be explained below in detail with reference to the accompanying drawings. The present invention is not limited to the following embodiments.

Embodiment

FIG. 1 is a schematic diagram illustrating an example of a configuration of a magnetic disk device 1 according to an embodiment.

The magnetic disk device 1 is connected to a host 2. The magnetic disk device 1 can receive access commands such as a writing command and a reading command from the host 2.

The magnetic disk device 1 includes a magnetic disk 11 on which a magnetic layer is provided. The magnetic disk device 1 writing data to the magnetic disk 11 and reads data from the magnetic disk 11 in response to the access command.

The data is written and read via a magnetic head 22. In addition to the magnetic disk 11, the magnetic disk device 1 includes a spindle motor 12, a lamp 13, an actuator arm 15, a voice coil motor (VCM) 16, a motor driver integrated circuit (IC) 21, the magnetic head 22, a hard disk controller (HDC) 23, a head IC 24, a reading/writing channel (RWC) 25, a processor 26, a RAM 27, a flash read only memory (FROM) 28, and a buffer memory 29.

The magnetic disk 11 is rotated at a given rotation speed by the spindle motor 12 attached thereto coaxially. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 by a write core 22w and a read core 22r provided in the magnetic head 22. The magnetic head 22 is attached to a distal end of the actuator arm 15. The magnetic head 22 is moved in a radial direction of the magnetic disk 11 by the VCM 16. Note that one or both of the write core 22w and the read core 22r provided in the magnetic head 22 may be provided in a plural number for a single magnetic head 22.

When the rotation of the magnetic disk 11 is stopped, the magnetic head 22 is moved onto the lamp 13. The lamp 13 is configured to hold the magnetic head 22 at a position spaced apart from the magnetic disk 11.

The head IC 24 amplifies a signal read from the magnetic disk 11 by the magnetic head 22 in a reading operation, and outputs and supplies the amplified signal to the RWC 25. In a writing operation, the head IC 24 amplifies a signal that is supplied from the RWC 25 and corresponds to data to be written, and supplies the amplified signal to the magnetic head 22.

The HDC 23 performs, for example, control of transmission and reception of data to and from the host 2 via an I/F bus, and control of the buffer memory 29.

The buffer memory 29 is used as a buffer for data transmitted to and received from the host 2. For example, the buffer memory 29 is used for temporarily storing data to be written or data read from the magnetic disk 11.

The buffer memory 29 is constituted by a volatile memory that is capable of high-speed operation. The type of the memory constituting the buffer memory 29 is not limited to a specific type. The buffer memory 29 may be constituted by, for example, a dynamic random access memory (DRAM), a static random access memory (SRAM), or a combination of those memories. Note that the buffer memory 29 may be constituted by a nonvolatile memory.

The RWC 25 performs modulation, such as error correction coding, on data supplied from the HDC 23 to be written, and supplies the modulated data to the head IC 24. In addition, the RWC 25 performs demodulation including error correction processing on a signal that is read from the magnetic disk 11 and is supplied by the head IC 24, and outputs the demodulated signal to the HDC 23 as digital data.

The processor 26 is, for example, a central processing unit (CPU). The RAM 27, the flash read only memory (FROM) 28, and the buffer memory 29 are connected to the processor 26.

The FROM 28 is a nonvolatile memory. The FROM 28 stores firmware (program data), various operation parameters, etc. Note that the firmware may be stored in the magnetic disk 11.

The RAM 27 is constituted by, for example, a DRAM, an SRAM, or a combination thereof. The RAM 27 is used as an operation memory by the processor 26. The RAM 27 is used as an area onto which firmware is loaded and an area in which various types of management data are temporarily stored.

The processor 26 performs the overall control of the magnetic disk device 1 in accordance with firmware stored in the FROM 28 or the magnetic disk 11. For example, the processor 26 loads the firmware from the FROM 28 or the magnetic disk 11 onto the RAM 27, and controls the motor driver IC 21, the head IC 24, the RWC 25, the HDC 23, and so forth in accordance with the loaded firmware.

The configuration including the HDC 23, the RWC 25, and the processor 26 can also be regarded as a controller 30 that controls the operation of the magnetic disk device 1. In addition to these components, the controller 30 may include other components (for example, the RAM 27, the FROM 28, and the buffer memory 29).

In addition, firmware program may be stored in the magnetic disk 11. In addition, part of or all the functions of the processor 26 may be implemented by a hardware circuit such as a field-programmable gate array (FPGA) or an application specific integrated circuit (ASIC).

Note that the number of magnetic disks 11 included in the magnetic disk device 1 is not limited to one. In addition, the magnetic disk device 1 may include actuator arms 15 and magnetic heads 22 in the number corresponding to the number of magnetic disks 11. In addition, in a case where the magnetic disk device 1 includes magnetic heads 22, those magnetic heads 22 may be integrally moved, or may constitute groups each being independently movable.

FIG. 2A is a diagram illustrating an example of a configuration of the magnetic disk 11 according to the embodiment. Servo data used for positioning the magnetic head 22 is written to the magnetic layer formed on the surface of the magnetic disk 11, for example, by a servo writer or by self-servo writing (SSW).

In FIG. 2A, servo regions 41 arranged radially are illustrated as an example of arrangement of servo regions into which servo data is written. In the circumferential direction, a space between two servo regions 41 is a data region 42 into which data can be written. Tracks 50 are concentrically provided in the radial direction of the magnetic disk 11. Sectors are provided in the data region 42 on the tracks 50. Data with a given size (sector size) is written to each of the sectors.

The servo data includes a servo mark, a gray code, a burst pattern, and a post code. The servo mark indicates the start of the servo data. The gray code includes an ID for identifying each track 50 provided in the magnetic disk 11, that is, a track number, and an ID for identifying each servo sector (that is, a servo region 41) on the track 50, that is, a servo sector number. The burst pattern is data used for detecting an amount of positional deviation from the center of the track indicated by the track number included in the gray code. The track number included in the gray code is given as, for example, an integer value, and it is possible to obtain an offset amount below the decimal place on the basis of the position indicated by the track number by demodulating the burst pattern. That is, a current position of the magnetic head 22 in the radial direction is obtained by demodulating the burst pattern. The post code is data for correcting a positional deviation of a shape of the track 50 defined by the gray code and the burst pattern, from the ideal shape of the track 50.

When writing data to the magnetic disk 11 or reading data from the magnetic disk 11, the controller 30 executes positioning of the magnetic head 22, that is, seek control and tracking control, on the basis of servo data read from the servo region 41 by the magnetic head 22.

Figure 2B:
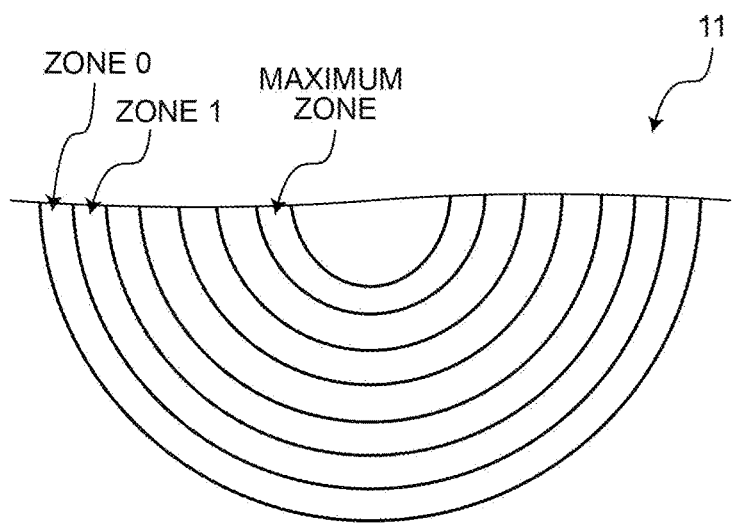
FIG. 2B is a schematic diagram illustrating an example of a zone in the magnetic disk according to the embodiment.

FIG. 2B is a schematic diagram illustrating an example of a zone in the magnetic disk 11 according to the embodiment. In the present embodiment, zones including two or more of the tracks 50 are set concentrically. The outermost circumferential zone is defined as Zone 0, and the zone number is incremented inward. The innermost circumferential zone is referred to as a maximum zone.

Figure 3:
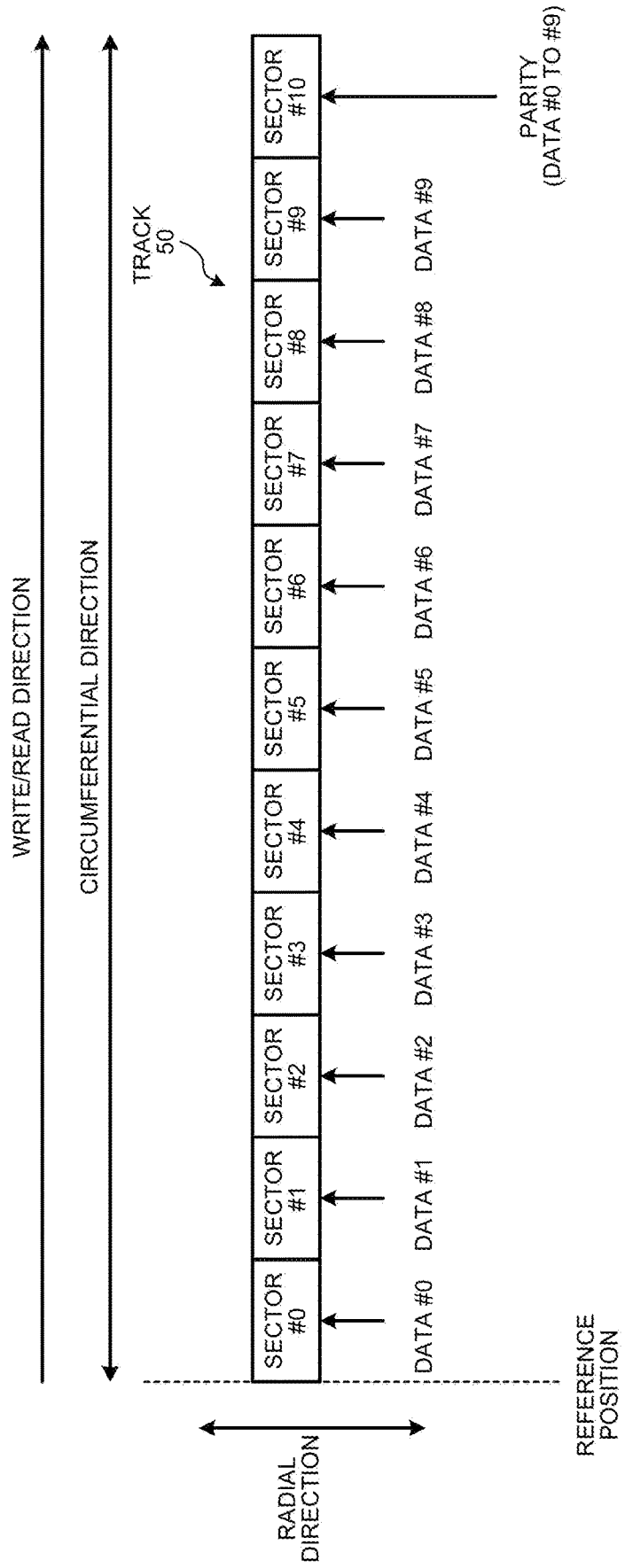
FIG. 3 is a schematic diagram illustrating an example of a configuration of one track according to the embodiment.

FIG. 3 is a schematic diagram illustrating an example of a configuration of one track 50 according to the embodiment. In FIG. 3, an illustration of the servo regions 41 is omitted. In addition, in FIG. 3, a writing/reading direction is illustrated. The writing/reading direction is a direction that the magnetic head 22 moves relatively to the track 50 by the rotation of the magnetic disk 11. The magnetic head 22 performs writing or reading of data in the writing/reading direction on each track 50.

Each sector provided in the track 50 is identified by a sector number. A sector whose sector number is x is referred to as a sector #x. In the example illustrated in FIG. 3, the track 50 contains eleven sectors from sector #0 to sector #10.

Data written to each sector includes an error correction code. The RWC 25 is capable of correcting an error on the data read from one sector in units of sectors by using the error correction code.

The error correction coding method for error correction in units of sectors is not limited to a specific method. In one example, a low-density parity-check code is applied as an error correction coding method for error correction in units of sectors.

The eleven sectors are arranged in order of sector number in the writing/reading direction from the reference position. In other words, the reference position is a position where a sector with the smallest sector number is disposed in the track 50. In the present disclosure, a beginning and an end are defined on the basis of the reference position and the writing/reading direction.

For example, with respect to a section from when the magnetic head 22 passes through the reference position to when the magnetic head passes through the reference position next time, namely, a section from the sector #0 to the sector #10, the sector through which the magnetic head 22 passes first, that is, the sector #0, is referred to as a beginning sector. With respect to the sector #0 to the sector #10, the sector through which the magnetic head 22 passes last, that is, the sector #10, is referred to as an end sector.

Moreover, the position of the sector where the passing of the magnetic head 22 is initiated is referred to as a beginning of the sector. The position of the sector where the passing of the magnetic head 22 is finished is referred to as an end of the sector.

The end sector #10 is a sector for storing a parity. The writing in units of tracks 50 is executed, for example, as follows. First, data is written to the sectors #0 to #9 in order of sector number. A parity generated on the basis of the group of data written to the sectors #0 to #9 is written to the end sector #10 of the track 50.

The parity written to the sector #10 protects a group of data written to the sectors #0 to #9 from occurrence of errors. That is, the parity written to the sector #10 protects the data in units of tracks. The error correction using the parity written to the sector #10 is referred to as error correction in units of tracks.

Each sector in which data is stored, such as the sector #0 to the sector #9, is referred to as a data sector. Data written to a data sector #x may be referred to as data #x. The data #x is an example of a data segment. A sector in which a parity is stored, such as the sector #10, is referred to as a parity sector.

A method of the error correction coding for error correction in units of tracks is not limited to a specific method. In one example, the parity is generated by executing XOR for each bit position on data #0 to data #9.

When data is written to one track 50 (referred to as a first track 50), a track 50 (as a second track 50) adjacent to the first track 50 is affected by ATI. The influence of ATI on the second track 50 is accumulated in accordance with the number of times of data writing to the first track 50. If the influence of ATI on the second track 50 becomes excessive, it becomes difficult to read the data stored in the second track 50.

The controller 30 executes data rewriting before it becomes difficult to read data from each track 50 due to the influence of ATI.

The controller 30 estimates a degree of influence of ATI on each track 50 by using, for example, ATI management information 271.

FIG. 4 is a schematic diagram illustrating an example of a data structure of the ATI management information 271 according to the embodiment. The ATI management information 271 is stored in the RAM 27. The ATI management information 271 has a data configuration of a table in which correspondence between the tracks 50 and ATI counters are recorded. When data is written to the track 50, the controller 30 increments the ATI counter for an adjacent track 50 adjacent to a target track 50 to which the data is written. The value to be added in one increment can be determined by a designer by using any method. In one example, the closer to the target track 50 to which the data is written, the larger the incremented value. The ATI counter indicates a degree of influence of ATI accumulated in the corresponding track 50.

The controller 30 compares, for each track 50, an ATI counter with the guaranteed number of times of writing as a threshold value. When an ATI counter exceeding the guaranteed number of times of writing is found, the controller 30 executes rewriting on the track 50 corresponding to the ATI counter. After the rewriting, the controller 30 resets the ATI counter of the track 50 on which the rewriting has been performed.

The guaranteed number of times of writing refers to the number of times of writing to a target track, which is guaranteed that data can be read from a track adjacent to this target track. In other words, the guaranteed number of times of writing is the number of times of writing for determining a timing at which rewriting is executed on a data sector to prevent the adjacent track interference (ATI). The guaranteed number of times of writing is adjusted and set in advance in the process of manufacturing the magnetic disk device 1, namely, before shipment of the magnetic disk device 1. The guaranteed number of times of writing may also be referred to as the guaranteed number of times of ATI writing.

The ideal guaranteed number of times of writing depends on the characteristics of the medium of the magnetic disk 11 and the characteristics of the magnetic head 22. Therefore, the ideal guaranteed number of times of writing may differ for each magnetic head 22 or each track 50.

In a comparative example, in the process of manufacturing a magnetic disk device, in order to shorten a reading time, the guaranteed numbers of times of writing are adjusted at specific positions of the magnetic disk, for example, at three inner, middle, and outer circumferential positions, and are set in the ROM. Then, in tracks near the three inner, middle, and outer circumferential positions where the guaranteed numbers of times of writing are set, the rewriting processing is performed with the same guaranteed numbers of times of writing. Therefore, in such a comparative example, there is a possibility that a timing of rewriting processing in a track away from the track for which the guaranteed number of times of writing has been adjusted may deviate from the ideal timing. Therefore, in the magnetic disk device according to the comparative example, there is a high possibility that an ATI failure may occur, and, as a result, there is a possibility that the performance of the magnetic disk device may deteriorate.

Therefore, in the present embodiment, the guaranteed numbers of times of writing are adjusted and set when the magnetic disk device 1 is operated after shipment at positions other than the specific positions (e.g., inner, middle, and outer circumferential positions) of the magnetic disk 11 for which guaranteed numbers of times of writing have been adjusted and set before the shipment. With this configuration, the guaranteed numbers of times of writing are adjusted to optimum values, thereby improving the performance of the magnetic disk device 1.

Specifically, in the present embodiment, the controller 30 adjusts guaranteed number of times of writing by using a parity sector being invalid.

For example, in a case where writing is performed in units of tracks with respect to a track 50 (referred to as a third track 50), in other words, in a case where writing is sequentially performed, the third track 50 becomes a state where all the data is protected by the parity. In this case, the parity sector is valid, so that the protection by the parity is valid.

On the other hand, when the controller 30 performs overwriting on part of the data sectors of the third track 50, that is, when the controller 30 performs writing by random access on the data sectors, the third track 50 becomes a state where all the data is not protected by the parity. In this case, the parity sector is invalid, so that the protection by the parity is invalid. The invalid parity sector is not used for error correction.

Therefore, in the magnetic disk device 1 according to the present embodiment, in a case where writing is performed on the data sector by random access as described above, that is, in a case where writing is performed on some of the data sectors, the controller 30 executes processing of adjusting the guaranteed number of times of writing by using the parity sector that becomes invalid by the writing with the random access.

In a case where invalid parity sectors are consecutively present in a given number of tracks among the tracks 50 adjacent to one another in a diameter direction, the controller 30 executes processing of adjusting the guaranteed numbers of times of writing by using the invalid parity sectors.

The processing of adjusting the guaranteed number of times of writing includes processing of: repeatedly performing writing to an invalid parity sector and reading from a parity sector of a track adjacent to the track having the parity sector to which the writing has been performed multiple times, and determining the guaranteed number of times of writing on the basis of the number of times of writing at the time when the reading from the parity sector of the adjacent track is no longer available. The multiple times correspond to, for example, 1000 to 10000 times, but are not limited thereto.

Specifically, in one example, the controller 30 sets the guaranteed number of times of writing to a value of 50% or 20% of the upper limit value (marginal value) of the number of times of writing that corresponds to a case where the data cannot be read from the parity sector of the adjacent track. However, the setting of the guaranteed number of times of writing is not limited thereto.

FIG. 5 is a diagram illustrating an example of a data structure of a parity sector table 273 according to the embodiment. The parity sector table 273 is a table representing whether each parity sector is in a valid state or in an invalid state. The parity sector table 273 is stored in the RAM 27.

As illustrated in FIG. 5, the parity sector table 273 has a data structure that a track number and a parity sector valid/invalid flag are associated with each other. The parity sector valid/invalid flag is a flag indicating whether a parity sector of a track corresponding to a track number is valid or invalid, and "0" indicates valid and "1" indicates invalid. In the example of FIG. 5, it can be seen that the parity sectors of the tracks whose track numbers are 1 and M to M+3 are invalid. The parity sectors of the tracks M to M+3 are consecutively invalid.

When data is written to data sectors by random access, the controller 30 sets "1" (invalid) to a valid/invalid flag of a parity sector corresponding to the track number of the track to which the data has been written in the parity sector table 273. In addition, the controller 30 searches for parity sectors being consecutively invalid by making reference to the parity sector table 273.

Then, the controller 30 executes, for all the zones, processing of adjusting the guaranteed numbers of times of writing on tracks whose invalid parities are consecutive. Specifically, the controller 30 executes processing of adjusting the guaranteed number of times of writing on a track in a zone for which the guaranteed number of times of writing has not been adjusted, that is, a zone where there is a track for which the guaranteed number of times of writing has not been adjusted, among the zones from the outermost circumferential zone (i.e., Zone 0) to the innermost circumferential zone (i.e., the maximum zone; Zone Max).

FIG. 6 is a diagram illustrating an example of a guaranteed-number-of-times-of-writing table 275 according to the embodiment. The guaranteed-number-of-times-of-writing table 275 is a table representing, for each zone, the guaranteed number of times of writing and a flag as to whether adjustment thereto has been performed. The guaranteed-number-of-times-of-writing table 275 is stored in the RAM 27.

As illustrated in FIG. 6, in the guaranteed-number-of-times-of-writing table 275, zones, guaranteed number of times of writing, and adjusted flags are associated with each other. The adjusted flag representing whether or not processing of adjustment to the guaranteed number of times of writing has been performed, and "1" indicates that the processing of adjustment has been performed, and "0" indicates that the processing of adjustment has not been performed. In the example of FIG. 6, the processing of adjustment has been performed for outer circumferential zones 0, 1, and 2, middle circumferential zones O, O+1, and O+2, inner circumferential zones P+1 and P+2, and the maximum zone (Max). In the present embodiment, the outer circumferential zones 0, 1, and 2, the middle circumferential zones O, O+1, and O+2, the inner circumferential zones P+1 and P+2, and the maximum zone (Max) have already been subjected to the processing of adjusting the guaranteed number of times of writing before shipment. Additionally, the flag "0" is set for each zone (i.e., Zone 3) having a track on which the processing of adjusting the guaranteed number of times of writing has not been performed.

Making reference to the guaranteed-number-of-times-of-writing table 275, the controller 30 performs the processing of adjusting the guaranteed number of times of writing for zones whose flag is "0" indicating that the processing of adjustment has not been performed. As a result, the processing of adjusting the guaranteed numbers of times of writing is performed for tracks whose invalid parities are consecutive among all the zones.

Figure 7:
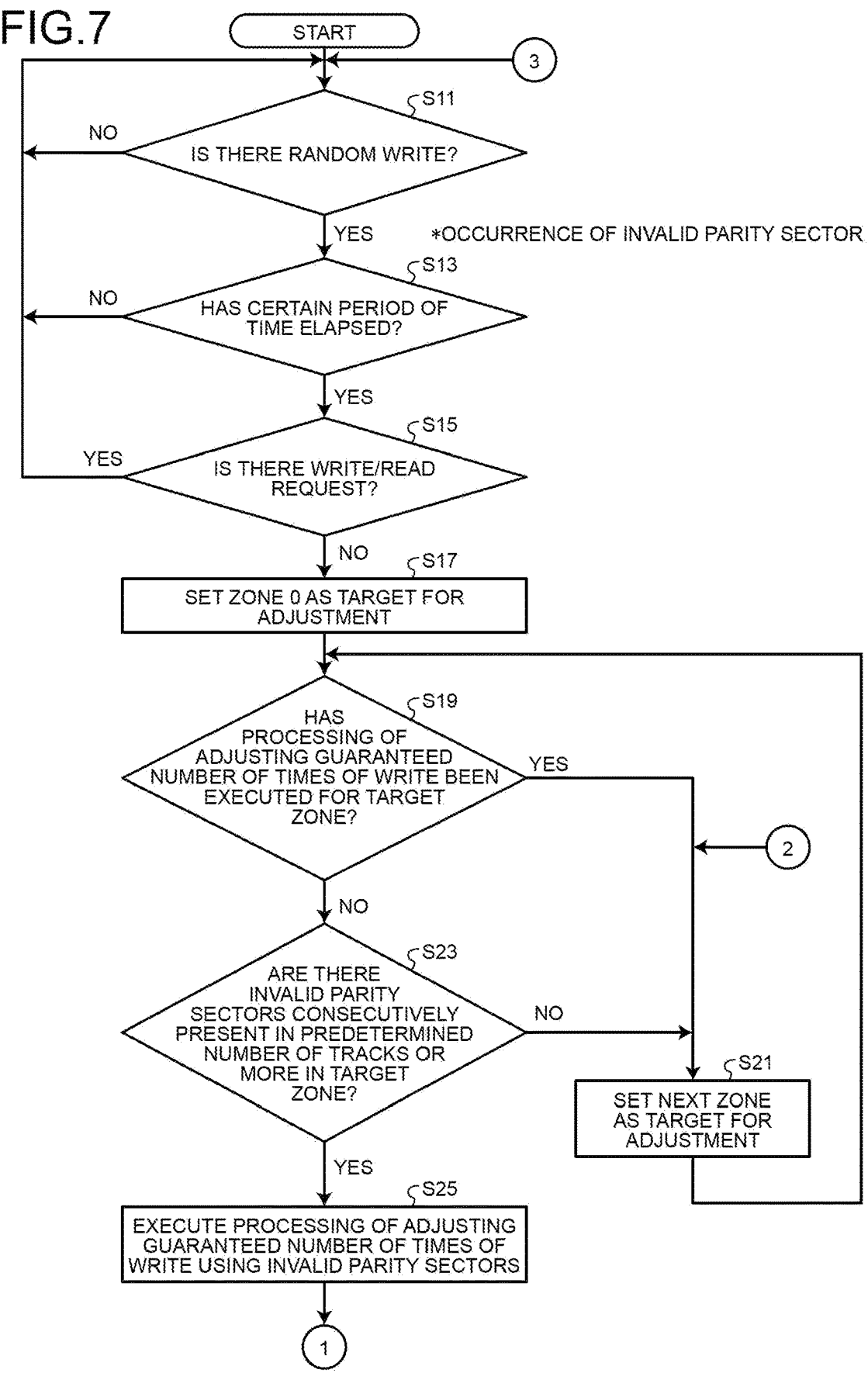
FIG. 7 is a flowchart illustrating an example of processing of adjusting the guaranteed number of times of writing according to the embodiment.
Figure 8:
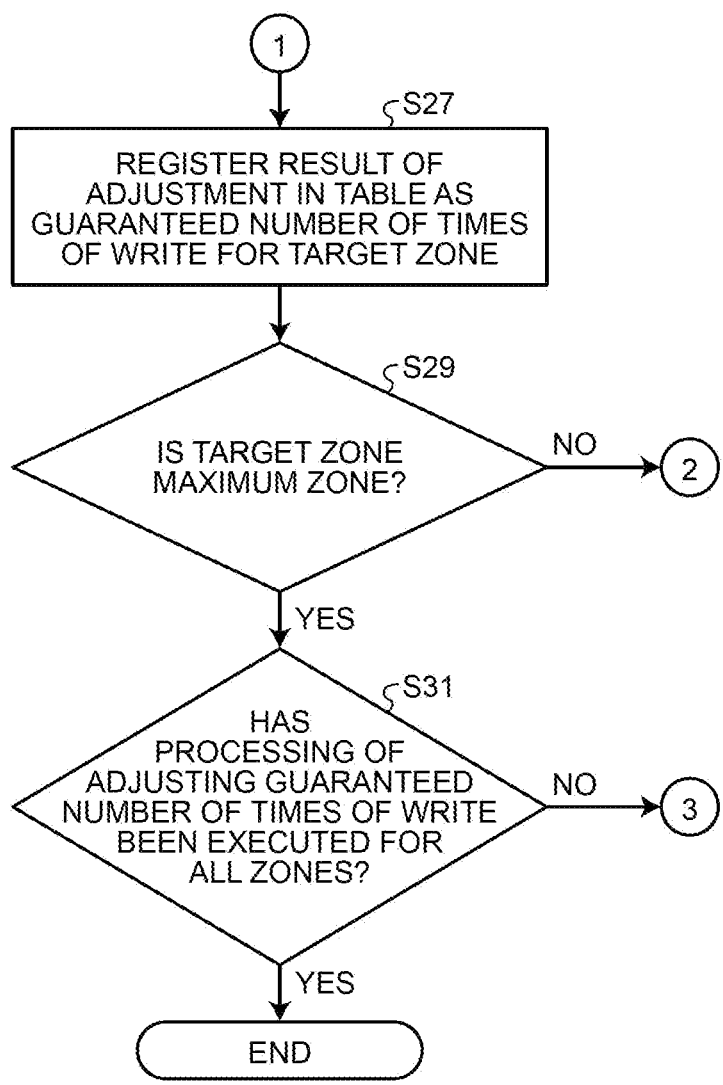
FIG. 8 is a flowchart illustrating an example of processing of adjusting the guaranteed number of times of writing according to the embodiment.

Next, the processing of adjusting the number of times of writing by the magnetic disk device 1 configured as described above according to the present embodiment will be described. FIGS. 7 and 8 are flowcharts illustrating the processing of adjusting the guaranteed number of times of writing according to the embodiment.

First, before shipment of the magnetic disk device 1, the processing of adjusting the guaranteed number of times of writing has already been executed in tracks of three outer, middle, and inner circumferential zones of the magnetic disk 11, and guaranteed numbers of times of writing and adjusted flags have been set in the guaranteed-number-of-times-of-writing table 275. The guaranteed-number-of-times-of-writing table 275 of FIG. 6 indicates a state at the time of shipment.

Figure 9:
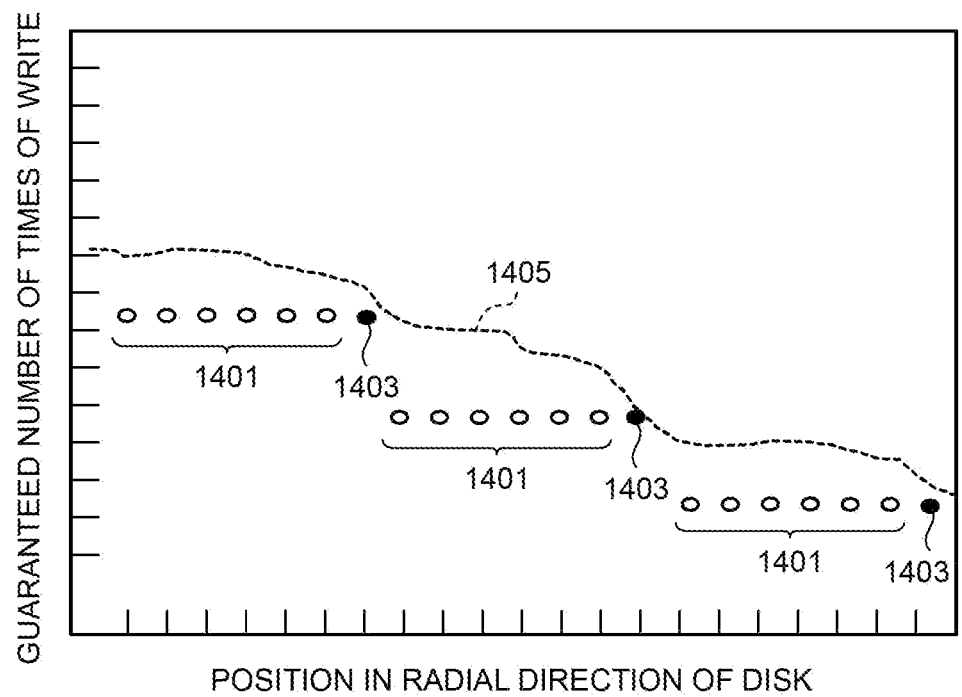
FIG. 9 is a diagram illustrating an example of a graph of a relationship between tracks and guaranteed numbers of times of writing at the time of shipment according to the embodiment.

FIG. 9 is a diagram illustrating an example of a graph of a relationship between tracks and guaranteed numbers of times of writing at the time of shipment according to the embodiment. The horizontal axis represents the position of each track in the radial direction of the magnetic disk 11, and the left side of the horizontal axis corresponds to an outer circumferential side of the disk and the right side of the horizontal axis corresponds to an inner circumferential side of the disk. The vertical axis represents the guaranteed number of times of writing.

In the graph of FIG. 9, a dotted line 1405 indicates an optimum guaranteed number of times of writing for each track. Each of dark-colored circular points indicates a track for which the guaranteed number of times of writing has been adjusted before shipment of the magnetic disk device 1, and each of opened circular points indicates a track for which the guaranteed number of times of writing has not been adjusted before shipment of the magnetic disk device 1. Reference sign 1401 indicates each track for which the adjustment of the guaranteed number of times of writing has not been performed, and reference sign 1403 indicates each track for which the adjustment of the guaranteed number of times of writing has been performed.

At the time of shipment, as illustrated in FIG. 9, the adjustment of the guaranteed numbers of times of writing is performed only for inner, middle, and outer circumferential tracks of the magnetic disk 11. For the other tracks on which the adjustment of the guaranteed numbers of times of writing has not been performed, the guaranteed numbers of times of writing for the adjacent tracks on which the adjustment of the guaranteed number of times of writing has been performed are identically used. The similar state can also be seen in FIG. 6 that illustrates a state of the guaranteed-number-of-times-of-writing table 275 at the time of shipment. Moreover, at the time of shipment, as shown in FIG. 9, the opened circular point coincides with the reference sign 1401 indicating a track for which the adjustment of the guaranteed number of times of writing has not been performed, and the dark-colored circular point coincides with the reference sign 1403 indicating a track for which the adjustment of the guaranteed number of times of writing has been performed.

Figure 10:
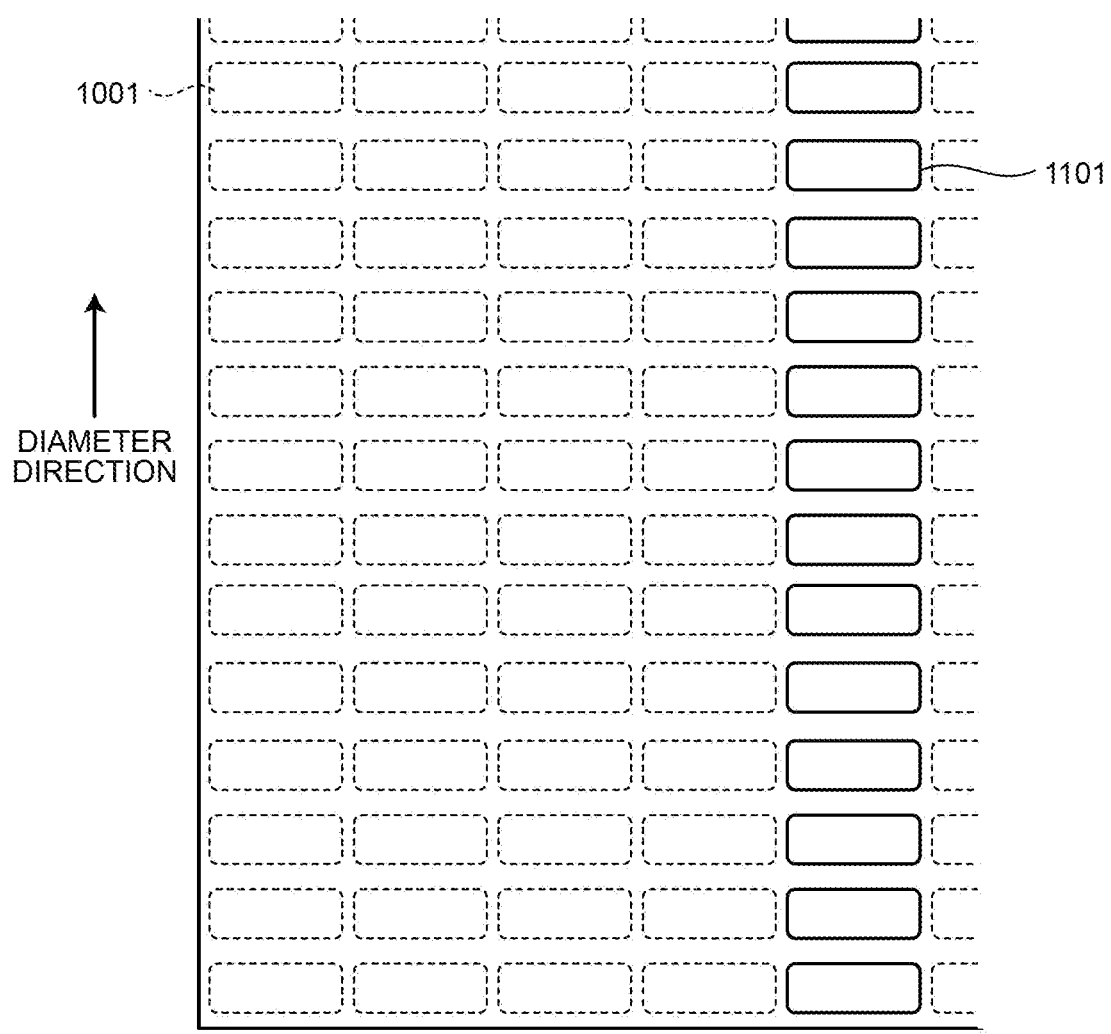
FIG. 10 is a diagram illustrating an example of states of sectors of the tracks according to the embodiment at the time of shipment.

FIG. 10 is a diagram illustrating an example of states of sectors of the tracks according to the embodiment at the time of shipment. A reference sign 1001 denotes a data sector, and a reference sign 1101 denotes a parity sector. Note that, in FIG. 10, reference signs are applied only to some data sectors and some parity sectors. When the parity sector 1101 is white (or non-colored), this indicates that the parity is valid.

Returning to FIG. 7, when the magnetic disk device 1 operates after shipment, the controller 30 determines whether random writing to data sectors has occurred (S11). When no random writing has occurred (S11: No), the controller 30 is in a standby state until random writing occurs.

When the random writing to the data sector has occurred (S11: Yes), the controller 30 determines whether a given period of time has elapsed from the start of the operation (S13). When the given period of time has not elapsed, the processing returns to S11. At this time, if the random writing to the data sector occurs, a parity sector of a track having the data sector to which the random writing has been occurred becomes invalid. In other words, an invalid parity sector occurs in the track.

Figure 11:
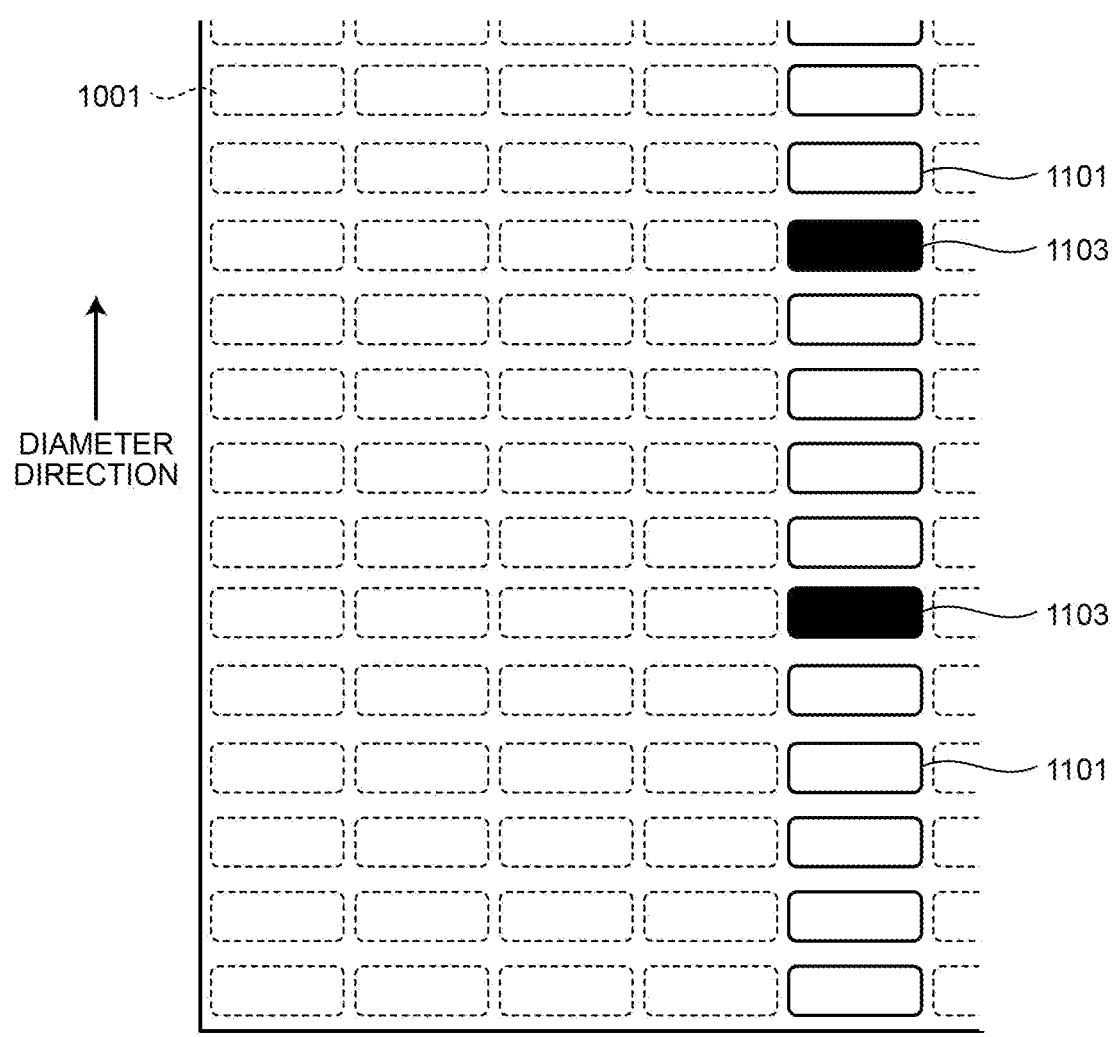
FIG. 11 is a diagram illustrating an example of states of sectors of the tracks in a case where an invalid parity sector has occurred according to the embodiment.

FIG. 11 is a diagram illustrating an example of states of sectors of the tracks in a case where an invalid parity sector has occurred according to the embodiment. A parity sector 1103 filled with a dark color is an invalid parity sector. A non-colored (white) parity sector 1101 is a valid parity sector. When random writing to data sectors 1001 has occurred, a parity sector in a track corresponding to each of the randomly-accessed data sectors becomes an invalid parity sector 1103 as illustrated in FIG. 11.

Returning to FIG. 7, when the given period of time has elapsed from the start of the operation in S13 (S13: Yes), the controller 30 determines whether there is a writing or reading request to any track (S15). When there is a writing or reading request to any track (S15: Yes), the processing returns to S11.

When there is no writing or reading request to any track (S15: No), the controller 30 sets, to Zone 0, a zone to be subjected to processing of adjusting the guaranteed number of times of writing (S17).

Note that, in the present embodiment, the processing of adjustment is started from Zone 0 toward the inner circumferential side, but the processing of adjustment is not limited thereto. For example, the controller 30 may be configured to start the processing of adjustment from the maximum zone toward the outer circumferential side.

Then, referring to adjusted flags corresponding to track numbers of tracks in the target zone in the guaranteed-number-of-times-of-writing table 275, the controller 30 determines whether the processing of adjusting the guaranteed number of times of writing has been executed for the tracks in the target zone (S19).

When all the tracks in the target zone have been subjected to the processing of adjusting the guaranteed number of times of writing (S19: Yes), the controller 30 sets the next zone, that is, a one-step further inward circumferential zone, as a zone to be subjected to processing of adjusting the guaranteed number of times of writing (S21). Then, the processing returns to S19.

When any track in the target zone has not been subjected to the processing of adjusting the guaranteed number of times of writing in S19 (S19: No), the controller 30 determines whether there are invalid parity sectors consecutively present in tracks of a given number or more, by making reference to valid/invalid flags of parity sectors of the tracks in the target zone in the parity sector table 273 (S23).

Figure 12:
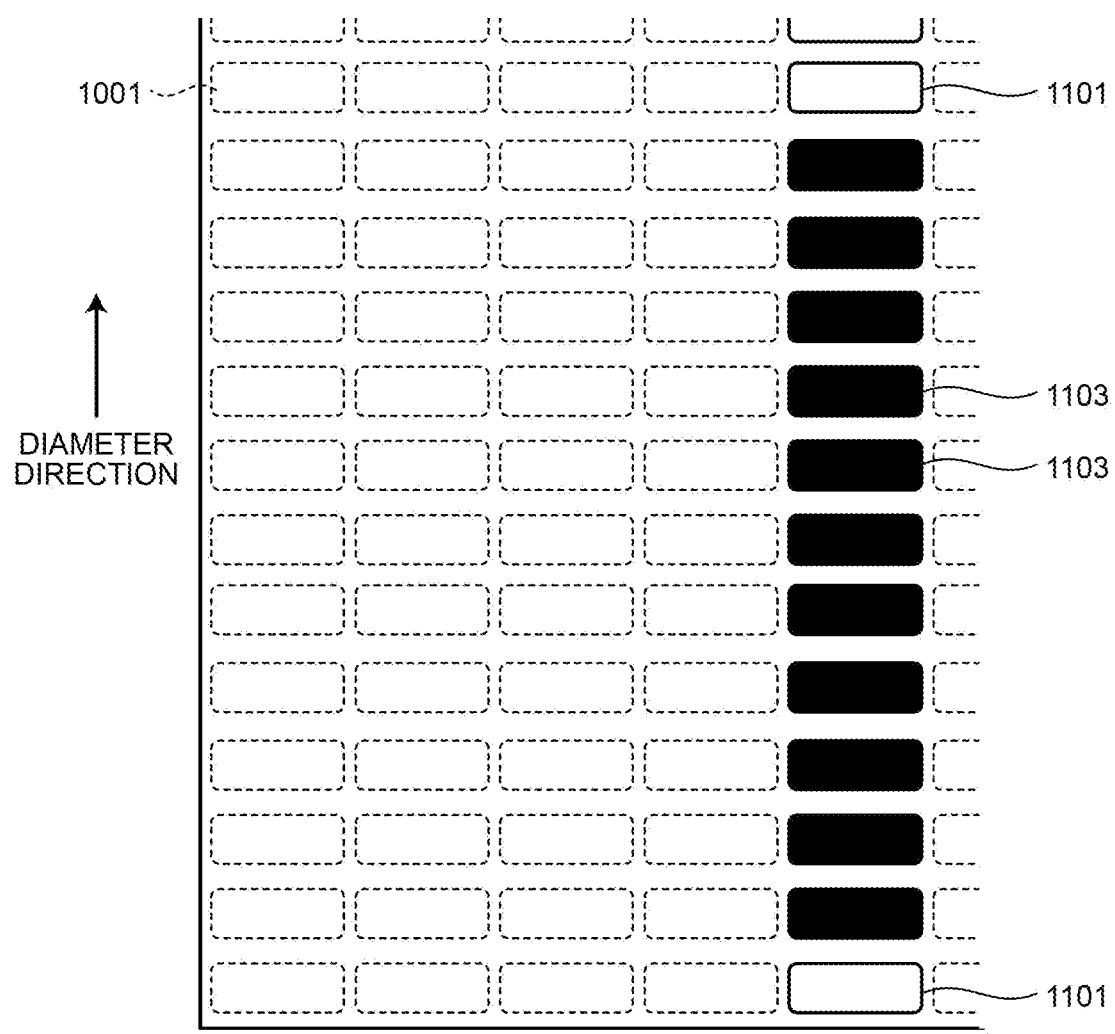
FIG. 12 is a diagram illustrating an example of states of sectors of the tracks in a case where invalid parity sectors have occurred in a given number of tracks or more according to the embodiment.

FIG. 12 is a diagram illustrating an example of states of sectors of the tracks in a case where invalid parity sectors have occurred in tracks of a given number or more according to the embodiment. In the example of FIG. 12, invalid parity sectors 1103 are consecutively present in eleven tracks. The given number of tracks is optionally determined, and values of two or more can be determined as the given number of tracks.

Returning to FIG. 7, when there are not invalid parity sectors consecutively present in a given number of tracks or more in S23 (S23: No), the controller 30) sets the next zone, that is, a one-step further inward circumferential zone, as a zone to be subjected to processing of adjusting the guaranteed number of times of writing (S21). Then, the processing returns to S19.

When there are invalid parity sectors consecutively present in a given number of tracks or more in S23 (S23: Yes), the controller executes processing of adjusting the guaranteed number of times of writing by using these invalid parity sectors consecutively present in the given number of tracks or more (S25).

Next, referring to FIG. 8, the controller 30 sets the guaranteed number of times of writing determined through the processing of adjusting the guaranteed number of times of writing as guaranteed number of times of writing corresponding to the track number of the track in the guaranteed-number-of-times-of-writing table 275 (S27).

Figure 13:
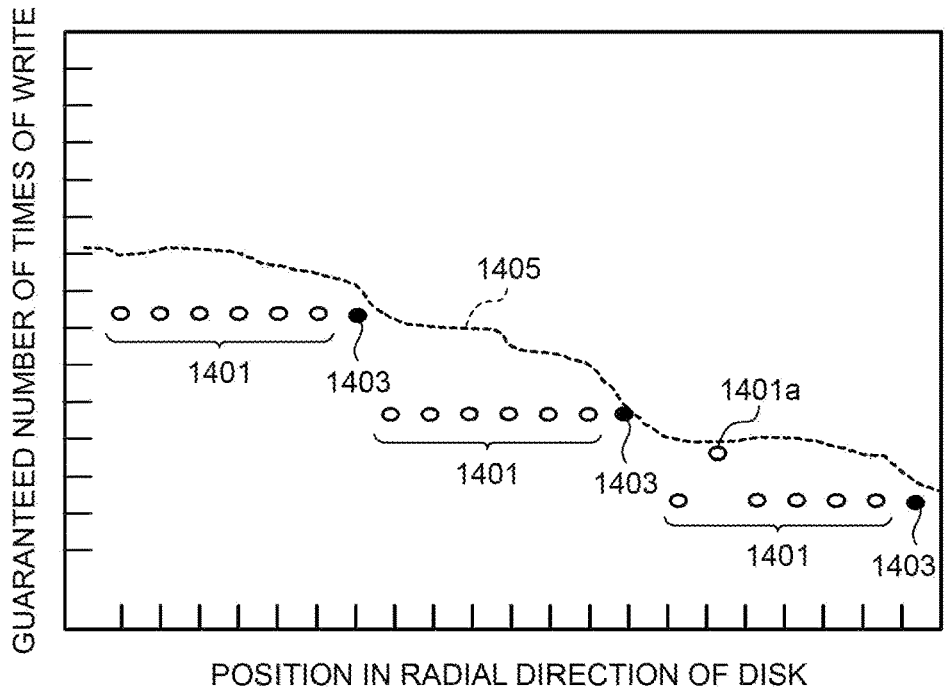
FIG. 13 is a diagram illustrating an example of a graph of a relationship between tracks and guaranteed numbers of times of writing in a state where processing of adjusting the guaranteed number of times of writing is executed once according to the embodiment.

FIG. 13 is a diagram illustrating an example of a graph of a relationship between tracks and guaranteed numbers of times of writing in a state where processing of adjusting the guaranteed number of times of writing is executed once according to the embodiment. The horizontal axis represents a position of a track in the radial direction of the magnetic disk 11, and the left side of the horizontal axis represents an inner circumferential side and the right side of the horizontal axis represents an outer circumferential side. The vertical axis represents the guaranteed number of times of writing.

In FIG. 13, as a result of executing processing of adjusting the guaranteed number of times of writing on a track denoted by a reference sign 1401a, the guaranteed number of times of writing for the track denoted by reference sign 1401a has approached the ideal guaranteed number of times of writing (i.e., the line 1405).

Returning to FIG. 8, the controller 30 determines whether the current target zone is the maximum zone, that is, the innermost circumferential zone (S29). When the current target zone is not the maximum zone (S29: No), the processing proceeds to S21, and the controller 30 sets the next zone, that is, a one-step further inward circumferential zone, as a zone to be subjected to processing of adjusting the guaranteed number of times of writing (S21). Then, the processing returns to S19.

Figure 14:
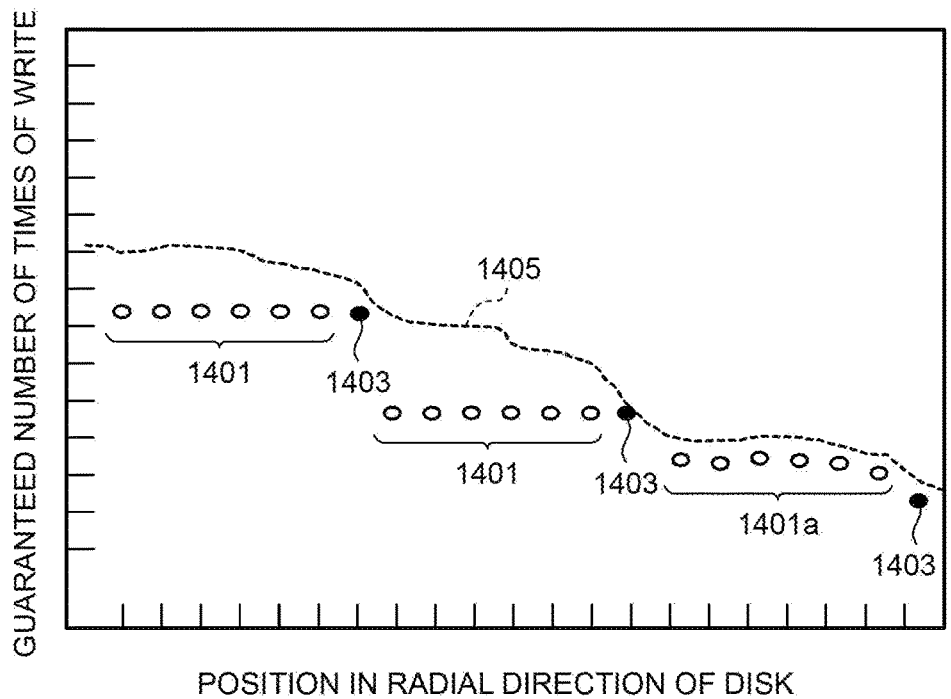
FIG. 14 is a diagram illustrating an example of a graph of a relationship between tracks and guaranteed numbers of times of writing in a state where processing of adjusting the guaranteed number of times of writing is executed on tracks in outer circumferential zones according to the embodiment.

FIG. 14 is a diagram illustrating an example of a graph of a relationship between tracks and guaranteed numbers of times of writing in a state where processing of adjusting the guaranteed number of times of writing is executed on tracks in part of the zones according to the embodiment. The horizontal axis represents a position of a track in the radial direction of the magnetic disk 11, and the left side of the horizontal axis represents an inner circumferential side and the right side of the horizontal axis represents an outer circumferential side. The vertical axis represents the guaranteed number of times of writing.

In FIG. 14, as a result of executing processing of adjusting the guaranteed number of times of writing on tracks in outer circumferential zones, the guaranteed numbers of times of writing for the tracks in the outer circumferential zones denoted by reference sign 1401a have approached the ideal guaranteed numbers of times of writing (i.e., the line 1405).

Referring back to FIG. 8, when the current target zone is the maximum zone in S29 (S29: Yes), the controller 30 determines whether the processing of adjusting the guaranteed number of times of writing has been executed for all the zones (S31). When the processing of adjusting the guaranteed number of times of writing has not been executed for any of the zones (S31: No), the processing returns to S11. On the other hand, when the processing of adjusting the guaranteed number of times of writing has not been executed for all the zones (S31: Yes), the processing ends.

Figure 15:
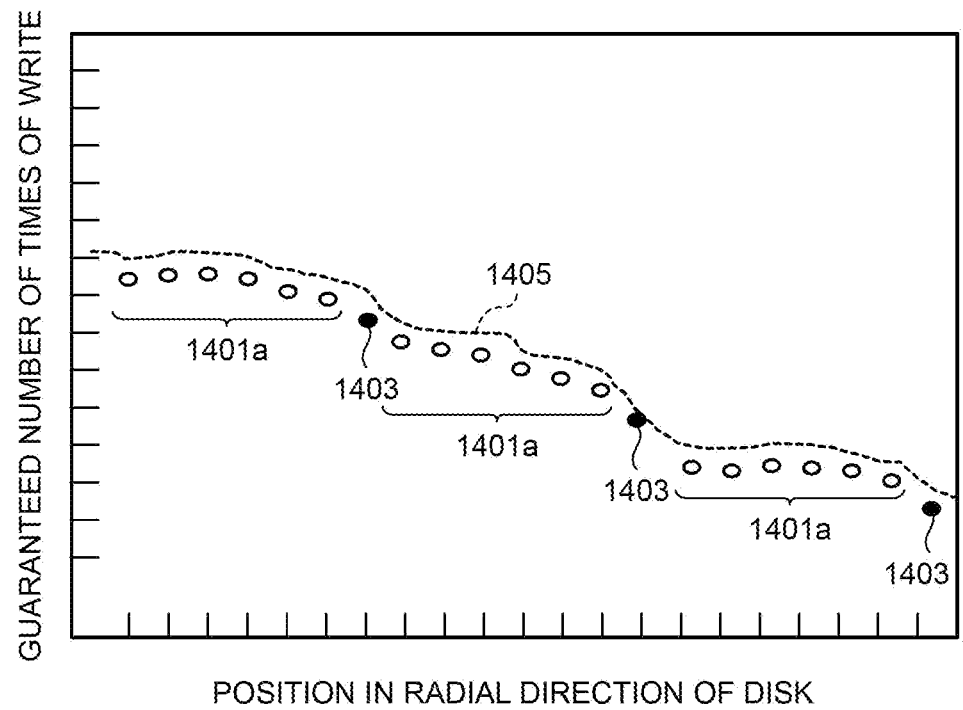
FIG. 15 is a diagram illustrating an example of a graph of a relationship between tracks and guaranteed numbers of times of writing in a state where processing of adjusting the guaranteed number of times of writing is executed on tracks in all the zones according to the embodiment.

FIG. 15 is a diagram illustrating an example of a graph of a relationship between tracks and guaranteed numbers of times of writing in a state where processing of adjusting the guaranteed number of times of writing is executed on tracks in all the zones according to the embodiment. The horizontal axis represents a position of a track in the radial direction of the magnetic disk 11, and the left side of the horizontal axis represents an outer circumferential side and the right side of the horizontal axis represents an inner circumferential side. The vertical axis represents the guaranteed number of times of writing.

In FIG. 15, as a result of executing processing of adjusting the guaranteed number of times of writing on tracks in all the zones, the guaranteed numbers of times of writing for the tracks in all the zones denoted by reference sign 1401a have approached the ideal guaranteed numbers of times of writing (i.e., the line 1405).

As described above, in the present embodiment, the magnetic disk device 1 includes the magnetic disk 11 on which multiple tracks are provided, the magnetic head 22, and the controller 30. Each of the multiple tracks includes data sectors and a parity sector. Each of the data sectors stores data segments. The parity sector stores a parity for error correction. The magnetic head 22 executes writing/reading to/from the magnetic disk 11. The controller 30 executes processing of adjusting a guaranteed number of times by using a parity sector being invalid. The guaranteed number of times indicates a number of times of writing for guaranteeing reading from an adjacent track. In the control method executed by the magnetic disk device 1 according to the present embodiment, the above-described processing of adjusting the guaranteed number of times of writing is executed by using the invalid parity sector. The processing of adjusting the guaranteed number of times of writing refers to processing of: repeatedly performing writing to the invalid parity sector and reading from a parity sector of the adjacent track, and determining the guaranteed number of times of writing on the basis of the number of times of writing at the time when the reading from the parity sector of the adjacent track is no longer available.

In the present embodiment, the invalid parity sector is not used for error correction. Therefore, even though writing to such an unnecessary parity sector is performed multiple times, there is only a little possibility that the operation of the magnetic disk device 1 is affected thereby. Therefore, according to the present embodiment, the processing of adjusting the guaranteed number of times of writing can be performed by using such an invalid parity sector without affecting the operation of the magnetic disk device 1, and the guaranteed number of times of writing can be adjusted to an optimum value, thereby improving the performance of the magnetic disk device 1.

In addition, in the present embodiment, the controller 30 executes processing of adjusting the guaranteed number of times of writing by using an invalid parity sector after shipment of the magnetic disk device 1. Therefore, according to the present embodiment, the guaranteed number of times of writing can be adjusted at a stage where the magnetic disk device 1 is actually used. Accordingly, it is possible to adjust the guaranteed number of times of writing to a more optimal value, thereby further improving the performance of the magnetic disk device 1.

In addition, in the present embodiment, in a case where writing to the data sectors is performed by random access, the controller 30 executes processing of adjusting the guaranteed number of times of writing by using a parity that becomes invalid due to the writing to the data sectors by random access. Therefore, according to the present embodiment, the invalid parity sector that has occurred by performing the random writing is not used for error correction. Therefore, even though the invalid parity sector is used, it is possible to execute rewriting processing in an optimum number of times of writing matching the characteristics of the medium of the magnetic disk or the magnetic head without adversely affecting the magnetic disk device 1. In the present embodiment, it is possible to reduce the influence of the ATI failure caused by insufficient rewriting processing and prevent a reduction in processing speed caused by excessive rewriting processing. As a result, the magnetic disk device 1 having higher performance can be provided. In addition, according to the present embodiment, the guaranteed number of times of writing can be adjusted in the actual operation of the magnetic disk device 1. Therefore, it is not necessary to adjust the guaranteed number of times of writing for all zones in the process of manufacturing the magnetic disk device, thereby shortening a reading time.

In addition, in the present embodiment, in a case where invalid parity sectors are consecutively present in a given number of tracks among the tracks adjacent to one another in a diameter direction of the magnetic disk 11, the controller 30 executes processing of adjusting the guaranteed numbers of times of writing by using the invalid parity sectors. Therefore, in the present embodiment, even if writing is performed multiple times to any of the invalid parity sectors consecutively present in the given number of tracks and parity sectors of adjacent tracks are affected by the writing, the parity sectors of the consecutively present adjacent tracks are invalid and are not used for error correction, and thus, the operation of the magnetic disk device 1 is not adversely affected. Therefore, in the present embodiment, it is possible to adjust the guaranteed number of times of writing to a more optimal value to reduce the influence of the ATI failure caused by insufficient rewriting processing and prevent a reduction in processing speed caused by excessive rewriting processing.

Moreover, in the present embodiment, the magnetic disk 11 is provided with zones each including tracks, and the controller 30 executes, for all the zones, processing of adjusting the guaranteed numbers of times of writing by using invalid parity sectors. Therefore, in the present embodiment, the guaranteed number of times of writing can be adjusted for all the tracks of the magnetic disk 11, and the guaranteed number of times of writing can be adjusted to a more optimal value to reduce the influence of the ATI failure caused by insufficient rewriting processing and prevent a reduction in processing speed caused by excessive rewriting processing.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
a magnetic disk on which multiple tracks are provided, at least one of the multiple tracks including first sectors and a second sector, each of the first sectors storing data segments, the second sector storing a parity for error correction;
a magnetic head configured to execute writing/reading to/from the magnetic disk; and
a controller configured to execute processing of adjusting a guaranteed number of times by using a second sector being invalid, the guaranteed number of times indicating a number of times of writing for guaranteeing reading from an adjacent track.

2. The magnetic disk device according to claim 1, wherein the controller executes the processing of adjustment using the second sector being invalid after shipment of the magnetic disk device.

3. The magnetic disk device according to claim 2, wherein, in a case where writing to the first sectors is performed by random access, the controller executes the processing of adjustment by using a second sector becoming invalid due to the writing to the first sectors by random access.

4. The magnetic disk device according to claim 3, wherein the controller executes the processing of adjustment using the second sector being invalid, in a case where the invalid second sector is consecutively present in each of a given number of tracks adjacent to one another in a diameter direction among the multiple tracks.

5. The magnetic disk device according to claim 4, wherein
the magnetic disk includes zones each constituted by two or more of the multiple tracks, and
the controller executes, for all the zones, the processing of adjustment using the second sector being invalid.

6. The magnetic disk device according to claim 1, wherein the processing of adjustment is processing including:
repeatedly performing writing to the second sector being invalid and reading from a second sector of the adjacent track; and
determining the guaranteed number of times on the basis of a number of times of writing at a time when the reading is no longer available.

7. A control method executed by a magnetic disk device, the magnetic disk device including a magnetic disk on which multiple tracks are provided and a magnetic head executing writing/reading to/from the magnetic disk, at least one of the multiple tracks including first sectors each storing data segments and a second sector storing a parity for error correction, the control method comprising:
executing processing of adjusting a guaranteed number of times by using a second sector being invalid, the guaranteed number of times indicating a number of times of writing for guaranteeing reading from an adjacent track.

8. The control method according to claim 7, wherein the executing of the processing of adjustment using the second sector being invalid is performed after shipment of the magnetic disk device.

9. The control method according to claim 8, wherein, in a case where writing to the first sectors is performed by random access, the executing of the processing of adjustment is performed by using a second sector becoming invalid due to the writing to the first sectors by random access.

10. The control method according to claim 9, wherein the executing of the processing of adjustment using the second sector being invalid is performed in a case where the invalid second sector is consecutively present in each of a given number of tracks adjacent to one another in a diameter direction among the multiple tracks.

11. The control method according to claim 10, wherein
the magnetic disk includes zones each constituted by two or more of the multiple tracks, and
the executing of the processing of adjustment using the second sector being invalid is performed for all the zones.

12. The control method according to claim 7, wherein the executing of the processing of adjustment is processing including:
repeatedly performing writing to the second sector being invalid and reading from a second sector of the adjacent track; and
determining the guaranteed number of times on the basis of a number of times of writing at a time when the reading is no longer available.

* * * * *